April 1, 1969      G. TIBERIO      3,435,710
AUTOMATIC PROGRESSIVE TRANSMISSION
Filed May 22, 1967      Sheet 1 of 4
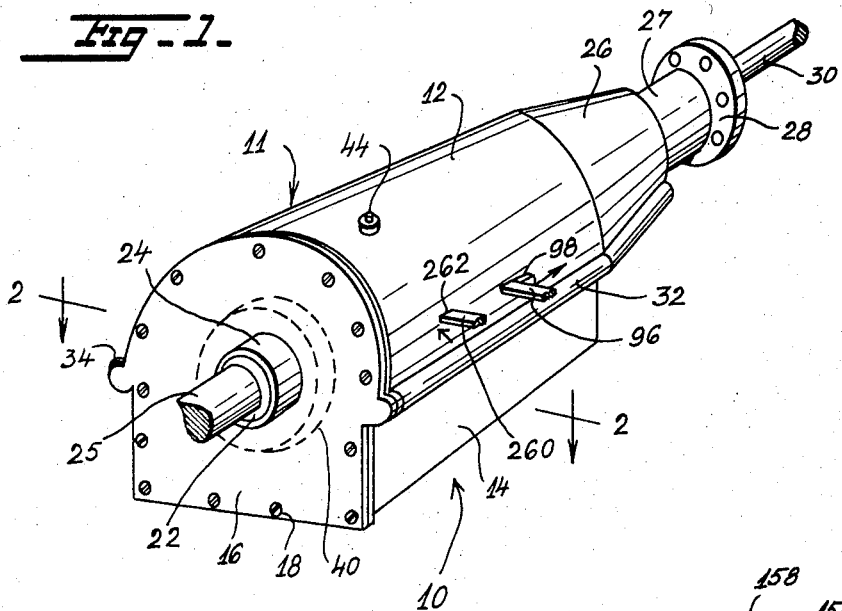
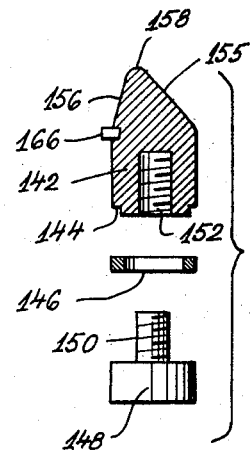
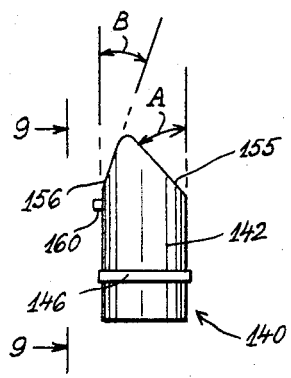
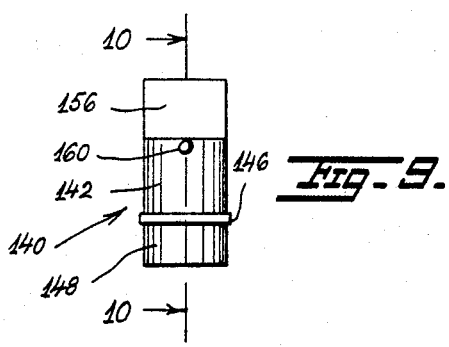
INVENTOR
Giuseppe Tiberio
BY Polachek & Saulsbury
ATTORNEYS April 1, 1969  G. TIBERIO  3,435,710
AUTOMATIC PROGRESSIVE TRANSMISSION
Filed May 22, 1967

INVENTOR
Giuseppe Tiberio
BY Polachek & Saulsbury
ATTORNEYS

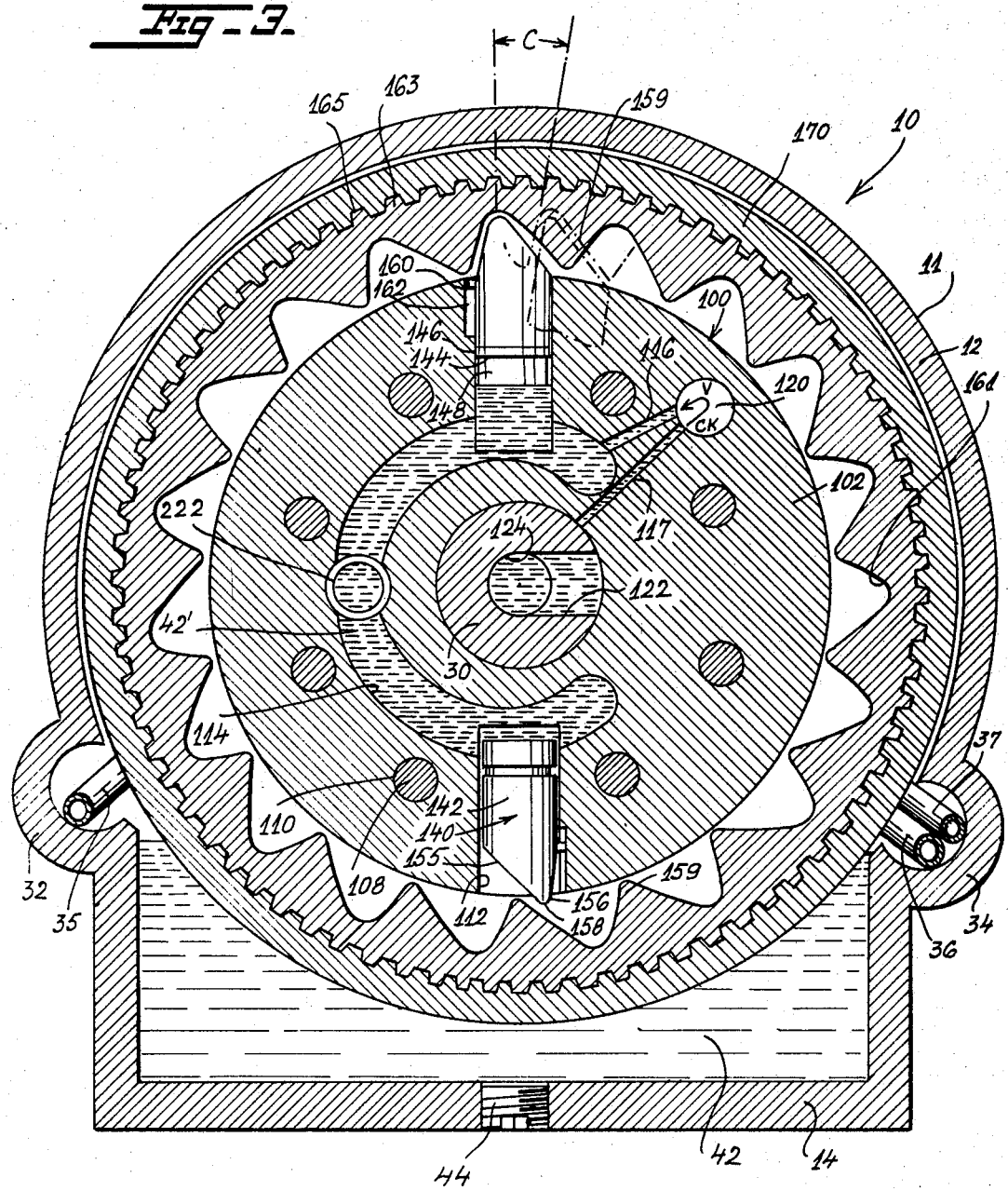

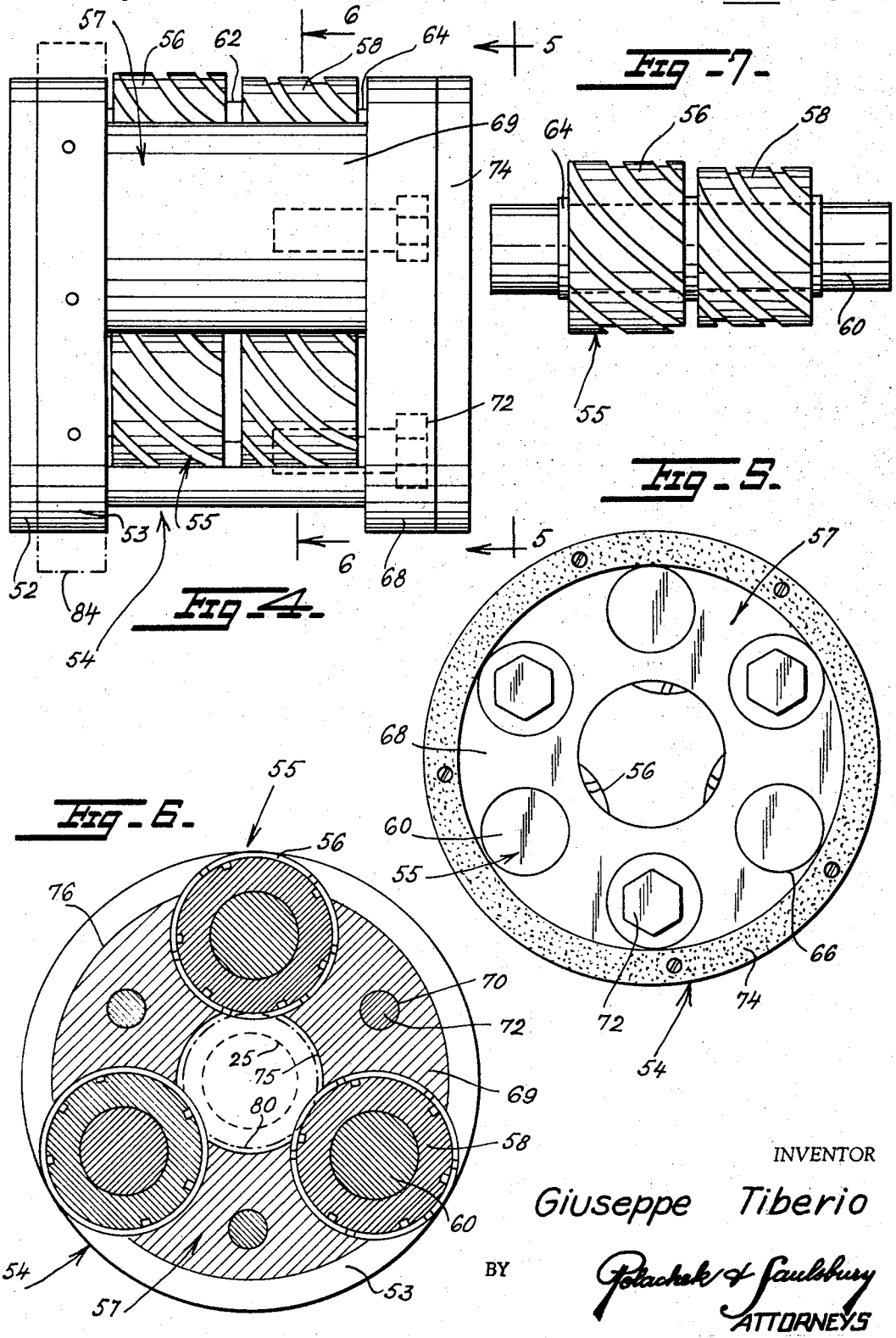

United States Patent Office 3,435,710
Patented Apr. 1, 1969

3,435,710
AUTOMATIC PROGRESSIVE TRANSMISSION
Giuseppe Tiberio, 2102 Kennedy Blvd.,
Union City, N.J. 07087
Filed May 22, 1967, Ser. No. 640,095
Int. Cl. F16h 3/74
U.S. Cl. 74—752          10 Claims

ABSTRACT OF THE DISCLOSURE

The disclosure describes a transmission assembly which is capable of uniform variation in transmission ratio between infinity and unity. The assembly includes a casing in which is a rotatable carrier of satellite gears coupled to a solar gear on a drive shaft. Various means are provided for coupling the satellite gear carrier to a rotatable carrier of reciprocatable piston-pawls. The piston-pawls cooperate with buttress gears carried by a rotatable bell secured to a driven shaft.

---

The invention concerns an automatic progressive transmission assembly. The invention concerns improvements over the transmission assembly described in my prior United States Patent 3,180,182.

According to the invention, there is provided an automatic progressive transmission assembly in which the ratio of speed of a drive shaft to speed of a driven shaft is uniformly and automatically variable between infinity and unity. The transmission assembly can be controlled electrically, hydraulically or by mechanical governor means. One object of the invention is to provide a progressive transmission assembly in which a compound satellite gear assembly driven by a drive shaft, the gear assembly having units which can be designed for any ratio up to over 100 to 1.

A further object is to provide a transmission assembly as described with a rotatable internally geared annular bell coupled to a driven shaft and driven by a pawl carrier assembly having reciprocatable piston-pawls operated by fluid pressure.

Another object is to provide a transmission assembly as described with a plurality of means for coupling the satellite gear assembly to the pawl carrier, so that the transmission assembly is capable of forward and reverse drive, and capable of drive at uniformly variable speed ratios between drive and driven shafts.

Another object is to provide a transmission assembly as described above wherein output drive speed relative to input drive is regulated by fluid pressure as determined by the speed of the input drive shaft, or by the governor on the driven shaft.

A further object is to provide a transmission assembly as described wherein the fluid pressure regulated by the drive shaft is used to actuate movable pistons which control transfer of fluid in the pawl carrier between piston-pawls.

Another object is to provide a transmission assembly as described above wherein the fluid pressure regulated by the drive shaft used to actuate movable pistons which control transfer of fluid in the pawl carrier between piston-pawls can be varied by fluid pressure regulator advancing or retarding the insertion of the transfer pistons regulator, or obtaining the same effect by altering the tension of the recoil spring.

Still another object is to provide a novel piston-pawl structure, capable of using conventional pressure metal rings on very small piston diameters.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of a transmission assembly embodying the invention.

FIG. 3 is a further enlarged vertical sectional view taken on line 3—3 of FIG. 2.

FIG. 4 is an enlarged side view of a satellite gear carrier employed in the assembly.

FIG. 5 is an end view taken on line 5—5 of FIG. 4.

FIG. 6 is a cross sectional view taken on line 6—6 of FIG. 4.

FIG. 7 is a side view of compound pinion gears employed in the satellite gear carrier.

FIG. 8 is a side view of a piston-pawl assembly.

FIG. 9 is a side view of the piston-pawl assembly taken on line 9—9 of FIG. 8.

FIG. 10 is an exploded sectional view taken on line 10—10 of FIG. 9.

Figure 2:
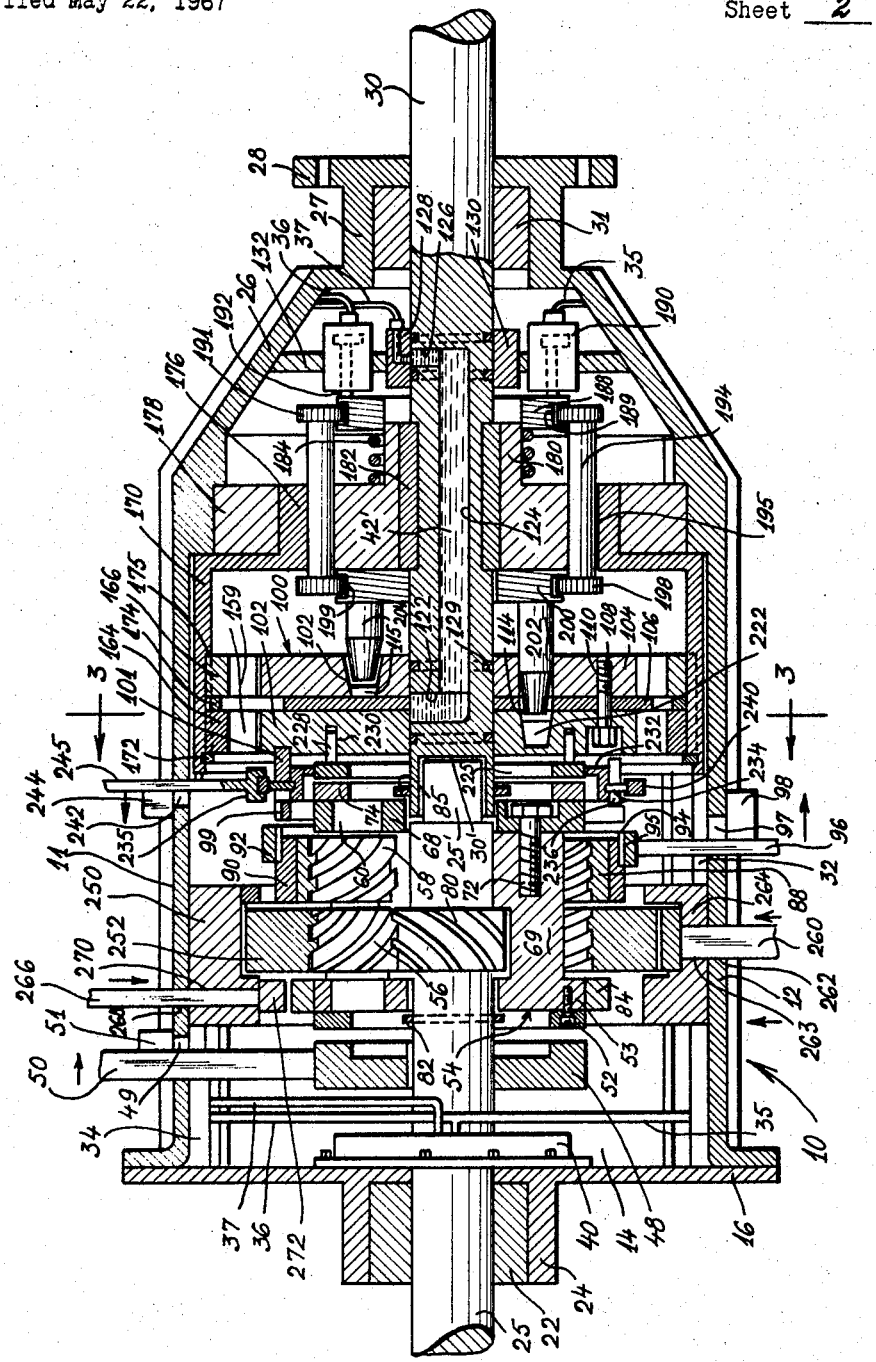
FIG. 2 is an enlarged horizontal cross sectional view taken on line 2—2 of FIG. 1.

Referring first to FIGS. 1, 2 and 3, the transmission assembly 10 is housed in a casing 11 having a generally cylindrical top 12 and a rectangular bottom 14. A front wall 16 is attached by bolts 18 to flange 20 at the front end of the casing. An oil seal and bearing 22 is inserted in a central nipple 24 at the front wall. A drive shaft 25 extends rotatably through the bearing 22 and front end wall 16. The casing is formed with a tapered rear section 26 having a cylindrical end section 27 which is provided with an apertured flange 28 for mounting the assembly to a suitable support or extension. A driven shaft 30 extends axially through the end section 27 in which is oil seal and bearing 31. A pair of outwardly extending channels 32, 34 are formed at opposite sides of the casing and extend its entire length. Oil transmission lines 35, 36 and 37 pass through these channels between opposite ends of the casing. An oil pump 40 is mounted on the inner side of the front wall and has a vaned rotor driven by shaft 25. The pump drives oil through the lines 35, 36 and 37. The oil intake of the pump is located at its underside so that the pump draws oil from oil supply 42 filling the lower rectangular bottom 14 of the casing. A removable drain plug 44 is provided at the bottom of the casing as shown in FIG. 3 and a removable oil filter plug 46 is provided at the top of the casing as shown in FIG. 1.

The drive shaft is connected to a drive motor or engine (not shown) externally of the assembly 10. A short distance from the oil pump 40 on shaft 25 is a front clutch plate 48 shown in FIG. 2. This clutch plate is movable axially slightly by an arm 50 extending radially of the casing through a slot 49 covered by guide plate 51. The clutch plate can be moved slightly rearwardly of shaft 25 to engage a clutch ring 52 mounted on the forward end wall 53 of satellite gear carrier assembly 54.

Satellite gear carrier assembly 54 is best shown in FIGS. 2, 4, 5 and 6 to which reference is now made. This gear carrier has a frame in which are three compound gear units 55. Each unit has helically grooved pinion 56 of larger diameter and a helically grooved pinion 58 of smaller diameter. The pinions are mounted on a short shaft 60 with a spacer ring 62 therebetween; see FIG. 7. The pinions are secured by splines or otherwise to the shaft and rotate with the shaft. The larger pinion is disposed forwardly of the smaller pinion in the satellite carrier. Spacer rings 64 are provided at outer sides of the pinions on the shaft. The pinions are provided with a substantial axial clearance to compensate for any possible error in the location of the respective teeth relative to the respective annular gear. Ends of the shaft 60 extend outwardly and are journalled in holes 66 provided in opposite end walls 53 and 68 of the satellite gear carrier frame 57. Three posts 69 extend rearwardly from the front wall. These posts have threaded holes 70 receiving fitted bolts 72 which hold the rear wall 68 on the posts. Clutch rings 52 and 74 are secured to outer sides of the front and rear walls 53 and 68 respectively. The posts have concave inner faces 75 and convex outer sides 76. Spaces are provided inside the carrier between the posts through which spaces the larger pinions 56 extend radially for engagement with a solar or sun gear 80 keyed to the drive shaft 25. At its forward end the carrier 54 is held by a snap ring 82 on shaft 25. A reverse drive control band 84 is mounted on the periphery of front end wall 53 of carrier 54. A ring or thrust bearing 85 is mounted on shaft 25 at the rear end of carrier 54 to hold it in position on the shaft.

The smaller pinions 58 extend radially outward of the carrier 54 through spaces between the posts 69. Engaged with all three of these pinions is an internally grooved ring gear 88. Surrounding this gear is a collar 90 on which is an axially movable sleeve 92 having radially inwardly extending splines 94 engaged in grooves 95 of the collar. The sleeve is movable axially by a radial arm 96 which extends out of the casing 11 through slot 97 covered by guide plate 98. Sleeve 92 can be moved rearwardly axially so that splines 94 engage in grooves 99 of a cylindrical extension 101 secured to the front face of a disk 102 forming part of pawl carrier assembly 100.

The pawl carrier assembly 100 is best shown in FIGS. 2, 3 to which reference is now made. Assembly 100 has two similar circular disks 102 and 104 spaced apart by a sealing plate 106 and secured in fixed position with respect to each other by bolts 108 having threaded ends engaged in threaded holes 110 in disk 104. Each disk 102 and 104 has a pair of diametrically opposed bores 112 in connection by a circumferentially extending duct 114 or 115 formed by a groove in one side of the disk facing sealing plate 106. Oil 42' flows from one bore 112 to the other via the duct. Oil is supplied to the duct via narrow ducts 116, 117 in each disk communicating with a one-way check valve 120 in each disk. Duct 116 opens into ducts 114 and 115. Ducts 117 receive oil from a radial passage 122 communicating with an axial passage 124 in driven shaft 30. At its rear end passage 124 terminates in radial passage 126 communicating with a passage 128 in a support bearing 130 for the shaft.

Rings 129, 131 seal the shaft on opposite sides of passages 122, 126. Bearing 130 is mounted in a partition 132 extending transversely of the tapered section 26 of the casing. Conduit 37 at one outlet of pump 40 extends through channel 34 and terminates at passage 128 in bearing 130.

Axially slidable in bores 112 radially of each disk 102 and 104 are piston-pawls 140. Each piston-pawl as best shown in FIGS. 3, 8, 9 and 10 has a cylindrical body 142 formed with a circumferential groove 144 at its lower end. This groove receives an oil sealing ring 146. The ring is held in place by a disk 148 provided with a threaded stud 150. This stud engages in a threaded bore 152 in body 142. The upper end of body 142 is formed with faces 155 and 156 inclined at angles A and B to parallel planes tangential to the cylindrical body. The faces 155, 156 meet in a cylindrically curved apical end 158 of the piston. Key 160 at the base end of face 156 extends radially and fits into a keyway 162 formed in the side of each bore 122 to prevent the piston-pawl from turning in the bore. Angle A of face 155 is 45° while angle B of face 156 is preferably about 15°.

Surrounding the disks 102 and 104 are buttress gears 164, 166. Each gear has the same odd number of ratchet teeth 159. The teeth of the buttress gears are slightly phased apart by angle C indicated in FIG. 3. This is one-quarter of the pitch of one tooth. The tapered ends of the piston-pawls in each disk enter the grooves 161 between teeth 159 alternately. While one piston is leaving one groove the other piston is entering another groove and vice versa so that the pawl carrier 100 and bell rotate with respect to each other as such. The piston-pawls in the two disks operate substantially in parallel with each other. The buttress gears have external splines 163 fitted in grooves 165 of cylindrical bell 170. The bell has a forward open end. A snap ring 172 holds gear 164 in place. A spacer ring 174 is interposed between the gears 164, 166. The rear gear 166 abuts a shoulder 175 formed in bell 170. The bell has a cylindrical end wall 176 fitted in a bearing 178 so that the bell is freely rotatable. The bell is formed with a tubular rear end section 180 secured by splines 182 to shaft 30 so that the bell rotates with the shaft. A coil spring 184 is mounted axially on end section 180 of bell. This spring bears at its forward end on end wall 176 of the bell.

The rear end of spring 184 bears against a disk 188 slidable axially on end section 180 of the bell. Two cylinders 190 are mounted in a rib or sectional partition 132 at diametrically opposite positions. Oil lines 35 and 36 connect to these cylinders and drive pistons 192 forwardly. These pistons contact disk 188. Disk 188 has a circumferential groove 189 in which is engaged heads 191 of two shafts 194. The shafts pass axially through bores 195 in end wall 176 of the bell. On forward ends of the shafts are heads 198 engaged in circumferentially positioned groove 199 of another rotatable disk 200 axially slidable on shaft 30. Disk 200 carries a pair of pistons 202 and 204 with tapered ends. Piston 202 is longer than piston 204. Piston 202 passes axially through a bore in disk 104, and in a registering hole in plate 106 and into tapered bore 222 in disk 102. This operates to regulate the flow of oil in curved duct 114 connecting bores 112. The shorter piston 204 extends into a tapered bore 224 in disk 104 for regulating flow of oil in curved duct 115. Pistons 202, 204 control resistance of the piston-pawls 140 to displacement by teeth of the buttress gears.

A rear clutch plate 225 is located at open front of the bell. The plate is axially movable since it is supported by pins 228 inserted in blind bores 230 in disk 102. The clutch plate 225 is secured to a flanged ring 232 slidably mounted in cylindrical extension 101 of pawl carrier assembly 100. Short arms 234 extend radially from ring 232 through slots 236 in cylindrical extension 101. An outer ring 240 is secured to arms 234. This ring is engaged by a forked end 235 of an operating arm 245 extending radially of the casing and out through slot 242. This slot is covered by guide plate 244 attached to arm 245. The rear clutch plate 225 can rotate with pawl carrier assembly 100. When arm 245 is moved forwardly the clutch plate 225 engages clutch ring 74 so to lock the satellite carrier 54 with the pawl assembly 100.

The drive shaft 25 has an inner end 25' of reduced diameter journaled in a recess 30' formed in the inner end of driven shaft 30. A fixed bearing 250 is provided in the casing in which an internal tooth ring gear 252 is journaled. This gear is in mesh with the outer sides of all the larger helical pinion gears 56. A forward drive control rod 260 extends radially of one side of the casing through an opening 262 near arm 96. This rod passes through hole 263 in bearing 250. The rod carries a shoe 264 which engages the freely rotatable gear 252 to retard it so as to cause the satellite carrier to rotate with shaft 25, at the ratio generated by the satellites.

A reverse drive control rod 266 extends radially of the casing near arm 50. This rod is movable in hole 268 and passes through hole 270 in bearing 250. This rod carries a shoe 272 which engages reverse drive control band 84 on wall 53 of the satellite carrier. The reverse band control locks the satellite carrier 54 causing gears 58 and 88 to reverse their normal forward direction of rotation.

In operation of transmission assembly 10, with parts arranged as in FIG. 3, rotation of drive shaft 25 by an external motor or engine will rotate the entire satellite carrier 54 along with gears 88 and 252, since solar gear 80 is engaged with gears 56 and gears 88 and 252 are both unloaded. The gears 88 and 252 rotate with the carrier 54. The assembly is now in neutral gear. Control rod 260 and shoe 264 are retracted. Sleeve 92 is retracted from extension 101 of pawl carrier assembly 100. Reverse control rod 266 and shoe 272 are retracted from band 84.

The rods 260 and 266 can be operated manually or automatically by any suitable mechanism. The mechanism should be arranged so that reverse drive control rod 266 can be retracted when the forward drive control rod 260 is applied and vice versa.

Forward drive—Example I

If coupling sleeve 92 is moved by means of arm 96 to connect collar 90 with extension 101 of pawl carrier assembly 100, and shoe 264 is applied to gear 252, this gear will stop rotating. Gears 56 engaged with gear 252 will now start rotating since they are driven by solar gear 80. Gears 58 will rotate with gears 56. Gears 56 will rotate with gear 88, which is now coupled to the pawl carrier assembly so that this assembly rotates.

As soon as the pawl carrier assembly begins to rotate the piston-pawls 140 begin to reciprocate within disks 102, 104 as they pass the teeth of buttress gears 164, 166. As the speed of shaft 25 begins to increase the oil driving pressure of pump 40 increases. This increases oil pressure in lines 35, 36 and 37. Increase in pressure in cylinders 190 pushes pistons 192 forwardly so that disks 188 and 200 move forwardly of the casing or to the left as viewed in FIG. 2. Pistons 202 and 204 carried by disk 200 move forwardly and restrict passage of oil along ducts 114 and 115. This effects a gradual reduction in the rate of transfer of oil from one cylindrical bore 112 to the diametrically opposite one in each disk 102 and 104. As drive shaft 25 increases in speed still more the pistons 202 and 204 become fully inserted in bores 222 and 224. This causes complete immobilization of the piston-pawls 140 since transfer from one pawl cylinder or bore 112 to the other is completely stopped. The buttress annular gears 164 and 166 rotate since the piston-pawls 140 are stopped. The bell 170 rotates with gears 164, 166 and consequently driven shaft 30 rotates. The ratio of input to output speeds of shafts 25 and 30 is determined by the ratio of diameters of the larger gears 56 in the satellite carrier 54 to the smaller gears 58. It will be noted that the transmission of power has been changed uniformly from infinity to a ratio greater than unity determined by the dimensions of the compound gear units 55.

Forward drive—Example II

If the coupling sleeve 92 is retracted to disengage the pawl carrier assembly and the rear clutch plate 225 is applied manually or automatically to the satellite carrier 54, the pawl carrier assembly 100 will rotate at a speed determined only by the larger gears 56 since the smaller gears 58 are now not coupled to extension 101. If the driving speed of shaft 25 is reduced, oil pressure generated by pump 40 will be reduced and the tapered pistons 202 and 204 will be retracted due to expansion of coil spring 184. The pistons 140 will reciprocate freely in the pawl carrier and minimum driving power will be applied to the output shaft 30. If now the speed of drive shaft 25 increases, the pistons 202 and 204 will again become fully inserted in bores 222, 224. The piston-pawls 140 will stop reciprocating and shaft will now rotate at a speed determined by the ratio of diameters of the solar gear 80 and the larger satellite gears 56. Again transmission of power has been progressively varied from infinity to the ratio generated by the large satellites 56.

Forward drive—Example III

Suppose now forward drive control 264 is retracted to release gear 252, and the front clutch 48 is applied to the satellite carrier assembly 54. The satellite gears 56 and 58 will rotate at a speed determined by the speed of shaft 25. If the speed of shaft 25 is now reduced the tapered pistons will be retracted by coil spring 184. Now the speed of drive shaft 25 can be increased while the tapered pistons 202 and 204 are advanced until they are completely inserted. The piston-pawls 140 will stop reciprocating and the pawl carrier assembly 54 will rotate at the speed of shaft 25. The bell 170 transmits the rotation to the output shaft 30. Transmission of power has been accomplished uniformly from infinity to unity.

If the front clutch is released and reverse control brake shoe 272 is applied, the satellite gears 56 will rotate in reverse direction. If now the coupling sleeve 92 is advanced, gear 88 coupled to the pawl carrier assembly 100 will rotate this assembly. The piston-pawls 140 will be held immobile in the pawl carrier assembly so that bell 170 rotates in reverse direction and the driven shaft 30 also rotates in reverse direction.

It will be apparent from the foregoing that the assembly is very versatile in its modes of operation and is capable of being applied to a wide range of uses such as machine tools, cranes, diesel engine units, turbine units, marine and air units, trucks, automobiles, etc. The transmission assembly will be adapted in each instance in size and load capacity to specification requirements. The transmission can be operated with a single conventional satellite eliminating thus the step generated by the compound planetary system. The gear dimension and gear ratios can be designed for particular load and speed requirements. Operation of the various control rods and arms can be manual or automatic depending on the auxiliary linkage designed to operate the transmission assembly. Such a system can be electrical or hydraulic. The number and angles A or the buttress gear teeth will be designed so as to minimize the number of pawl piston pulsations, thus producing a smoother transmission profile.

It will be understood that the clutches shown and described are merely illustrative and not binding since any kind of clutch from jaw to magnetic can and must be designed according to the specific use of the transmission.

While I have illustrated and described the preferred embodiments of my invention, it is to be understood that I do not limit myself to the precise construction herein disclosed and that various changes and modifications may be made within the scope of the invention as defined in the appended claims.

I claim:

1. An automatic transmission assembly, comprising a casing, a drive shaft rotatably supported in the casing, a fluid pump in the casing driven by said drive shaft for generating fluid pressure in accordance with speed of rotation of the drive shaft, a driven shaft rotatably supported in the casing, a bell axially secured on the driven shaft for rotation therewith in the casing, a satellite gear carrier assembly including at least one buttress gear mounted inside said bell for rotation therewith, said buttress gear having inwardly directed ratchet teeth, a pawl carrier rotatably mounted on said driven shaft and operatively connected to said buttress gear, said pawl carrier comprising at least one disk with diametrally aligned radial bores therein, piston-pawls reciprocatably disposed in said bores respectively with teeth extensible out of said disk for engaging with teeth of said buttress gear so that the buttress gear, bell and driven shaft rotate with the pawl carrier, said disk having a duct connecting said bores for passing fluid between the bores to reciprocate the piston-pawls simultaneously in opposite directions, said disk having an axially directed passage communicating with said duct, a piston support mounted on the driven shaft and movable axially thereof, said piston support carrying a piston movable in said passage for constricting the duct, hydraulic drive means operatively arranged to advance and retract said piston support for variably constricting said duct, and means interconnecting said pump and hydraulic drive means, whereby the constriction of said duct and consequent resistance of said piston-pawls to reciprocation is determined by the speed of rotation of the drive shaft, and whereby the ratio of rotational speeds of the drive shaft to the driven shaft is uniformly variable between infinity and unity.

2. An automatic transmission assembly as recited in claim 1, further comprising a satellite gear carrier rotatably mounted on the drive shaft, said gear carrier having a frame rotatably supporting at least one compound pinion gear unit including two pinion gears, means for releasably holding said frame stationary, gear means on the drive shaft engaged with one of the pinion gears for rotating the compound gear unit, and means for coupling the other pinion gear to the pawl carrier, whereby the driven shaft rotates at an output speed determined by the input speed of rotation of the drive shaft and by the ratio of diameters of the ratio of input speed to output speed is uniformly and progressively variable between infinity and unity.

3. An automatic transmission assembly as recited in claim 1, further comprising a satellite gear carrier rotatably mounted on the drive shaft, said gear carrier having a frame rotatably supporting at least one compound pinion gear unit including two pinion gears, means for releasably engaging said frame to hold the same stationary, gear means on the drive shaft engaged with one of the pinion gears for rotating the compound gear unit, other gear means in the casing engaged with said one pinion gear, means for holding the other gear means stationary so that the pinion gear unit rotates when the drive shaft rotates without revolving around the shaft, a ring gear in the casing engaged with the other pinion gear, and means for coupling the ring gear directly to the pawl carrier so that the pawl carrier is rotated by the drive shaft via said other pinion gear and ring gear.

4. An automatic transmission assembly as recited in claim 2, further comprising a clutch for coupling said frame to said pawl carrier directly, whereby the bell and driven shaft will rotate with the pawl carrier, while the pawl carrier is rotated by the satellite gear carrier which rotates with the drive shaft.

5. An automatic transmission assembly as recited in claim 1, further comprising a satellite gear carrier rotatably mounted on the drive shaft, said gear carrier having a frame rotatably supporting at least one pinion gear unit, a clutch for releasably holding said frame stationary, a solar gear carried by the drive shaft and rotatable therewith in engagement with said pinion gear unit, and means for coupling said pinion gear unit to the pawl carrier, whereby the bell, gear and driven shaft rotate at a speed determined by the speed of rotation of the drive shaft.

6. An automatic transmission assembly as recited in claim 1, wherein the hydraulic drive means further comprises another buttress gear in said bell disposed adjacent to the first named buttress gear, said pawl carrier operatively connected to the other buttress gear and comprising another disk with diametrally aligned oher radial bores, other piston-pawls reciprocatably disposed in said other radial bores for engaging alternately with said other buttress gear, said other disk having another duct connecting said other bores for passing fluid between the other bores to reciprocate the other piston-pawls simultaneously, said other disk having another axially directed passage communicating with said other duct, and another piston carried by said piston support and movable into said other passage for constricting the other duct, whereby the ducts in both disks are simultaneously variably constricted when the hydraulic drive means advances and retracts the piston support, so that constriction of both ducts and consequent resistance of the piston-pawls to reciprocation is dttermined by the speed of rotation of the drive shaft.

7. An automatic transmission assembly as recited in claim 6, further comprising a satellite gear carrier rotatably mounted on the drive shaft, said gear carrier having a frame rotatably supporting at least one compound pinion gear unit including two pinion gears, means for releasably holding said frame stationary, gear means on the drive shaft engaged with one of the pinion gears for rotating the compound gear unit, and means for coupling the other pinion gear to the pawl carrier, whereby the driven shaft rotates at an output speed determined by the input speed of rotation of the drive shaft and by the ratio of diameters of the two pinion gears, and whereby the ratio of input speed to output speed is uniformly and progressively variable between infinity and unity.

8. An automatic transmission assembly as recited in claim 6, further comprising a satellite gear carrier rotatably mounted on the drive shaft, said gear carrier having frame rotatably supporting at least one compound pinion gear unit including two pinion gears, means for releasably engaging said frame to hold the same stationary, gear means on the drive shaft engaged with one of the pinion gears for rotating the compound gear unit, other gear means in the casing engaged with said one pinion gear, means for holding the other gear means stationary so that the gear unit rotates when the drive shaft rotates without revolving around the shaft, a ring gear in the casing engaged with the other pinion gear, and means for coupling the ring gear directly to the pawl carrier so that the pawl carrier is rotated by the drive shaft via said other pinion gear and ring gear.

9. An automatic transmission assembly as recited in claim 7, further comprising a clutch for coupling said frame to said pawl carrier directly, whereby the bell and driven shaft will rotate with the pawl carrier, while the pawl carrier is rotated by the satellite gear carrier which rotates with the drive shaft.

10. A transmission assembly as recited in claim 1, wherein each piston-pawl has a cylindrical body formed with a tapered and rounded end engageable between teeth of the buttress gear and slidable smoothly passed said teeth, said body having a circumferential groove at the other end, a sealing ring disposed in the groove for sealing fluid in a bore in the disk of the pawl carrier, and a head at the other end of said body, said head having a threaded stud engaged with said body for holding the sealing ring in place in said groove.

References Cited
UNITED STATES PATENTS 2,208,224   7/1940   Murray _____ 74—752
3,180,182   4/1965   Tiberio _____ 74—752

ARTHUR T. McKEON, *Primary Examiner.*